United States Patent [19]

Thomas

[11] 3,993,088

[45] Nov. 23, 1976

[54] FOLDING WALKER

[75] Inventor: Morton I. Thomas, Nyack, N.Y.

[73] Assignee: Temco Products, Inc., Passaic, N.J.

[22] Filed: Sept. 15, 1975

[21] Appl. No.: 613,698

[52] U.S. Cl. .................................. 135/67; 248/166; 248/167; 403/350; 135/74

[51] Int. Cl.² .......................................... F16M 13/08

[58] Field of Search ...................... 135/45 A; D88/5; 248/166, 167; 108/124; 403/350

[56] References Cited

UNITED STATES PATENTS

| | | | |
|---|---|---|---|
| 935,885 | 10/1909 | Blake | 403/350 |
| 2,397,382 | 3/1946 | Smith | 403/350 |
| 2,667,914 | 2/1954 | Forbes | 135/45 A |
| 2,960,148 | 11/1960 | Murcott | 135/45 A |
| 3,442,276 | 5/1969 | Edwards et al. | 135/45 A |
| 3,658,079 | 4/1972 | Block | 135/45 A |
| 3,688,789 | 9/1972 | Bunch | 135/45 A |
| 3,783,886 | 1/1974 | Thomas | 135/45 A |
| 3,833,012 | 9/1974 | McAllister | 403/350 |
| 3,851,846 | 12/1974 | Long | 403/350 |

*Primary Examiner*—Werner H. Schroeder
*Assistant Examiner*—Conrad L. Berman
*Attorney, Agent, or Firm*—Behr & Woodbridge

[57] ABSTRACT

A folding invalid walker includes an improved mechanism for rigidly locking the walker in its unfolded state. The mechanism comprises a pair of tubular telescoping members each having an inner portion which telescopes into an outer portion. A spring loaded button is used to lock the tubular telescoping member in its extended state. One end of each of the tubular telescoping members is riveted to the rear leg of the walker support and the other end is pivotally connected to a transversely disposed bar connecting both front legs of said walker. The rivet connection is slightly flexible so that the tubular telescoping member can flex a small amount with respect to the rear leg of said support as the walker is folded from its folded to its unfolded state and vice versa. The location of the pivot joint on the rear leg is such that a rivet can be used and a more expensive and less rigid pivot connection can be avoided. The walker also has other improved features including a pair of gussets on the transverse bar for added rigidity; a leg embracing means for improving the connection between the transverse bar and the supports and an improved extensible leg section which increases the extension range of the leg members.

10 Claims, 10 Drawing Figures

FIG. 4
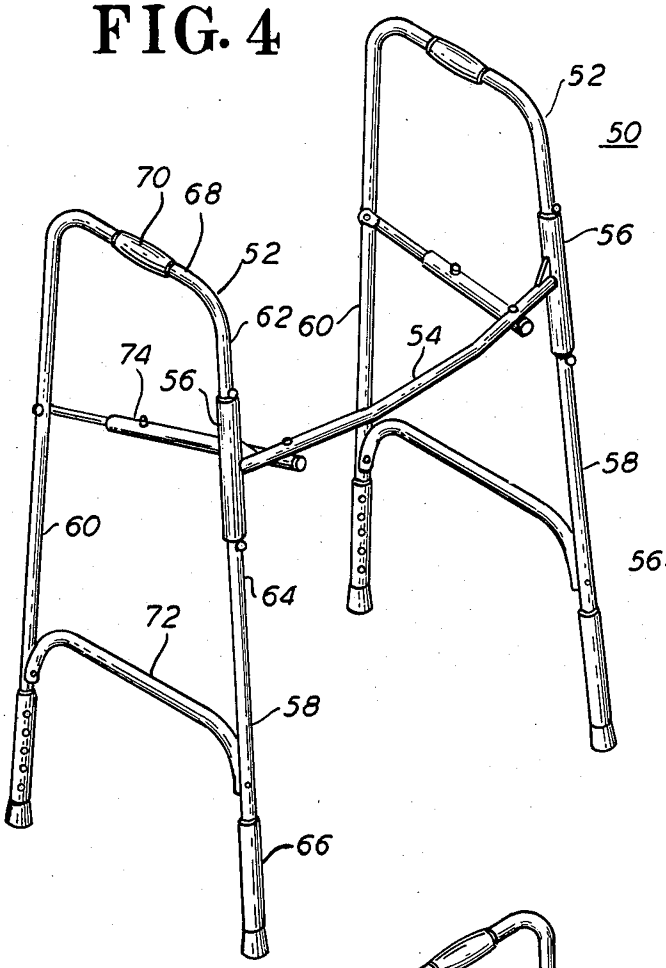
FIG. 6
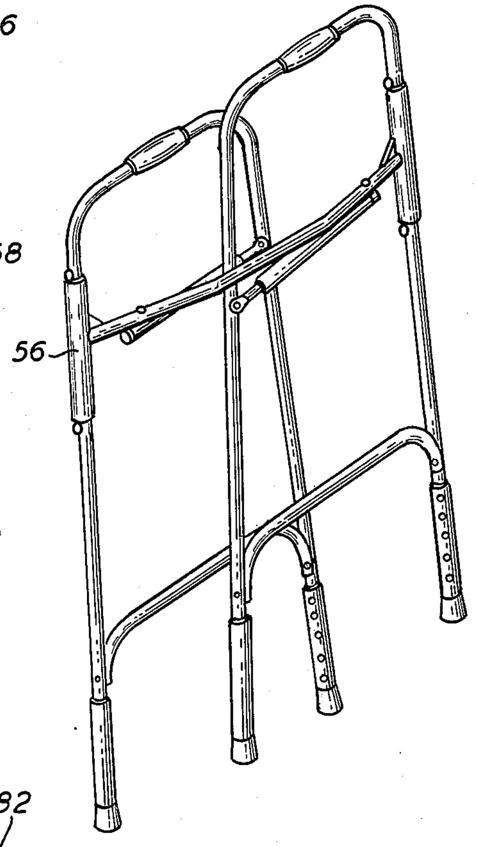
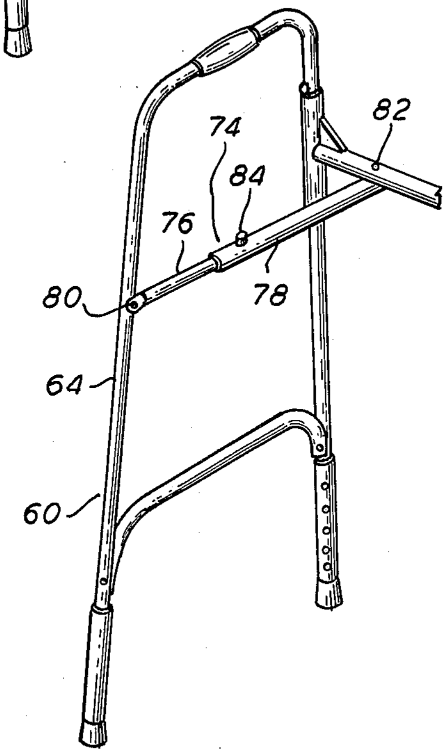
FIG. 5

FOLDING WALKER

BACKGROUND OF THE INVENTION

1. Field of the Invention

This invention relates to walkers of the type used to aid individuals in walking.

2. Description of the Prior Art

Many different types of walkers are known to those of ordinary skill in the art. One early type of walker comprised a rigid unfoldable frame which allowed an invalid to give himself additional support with his arms while walking. One difficulty with such prior art walkers is that they take up a lot of room and are therefore difficult to transport and store due to their size. An example of a rigid nonfolding walker can be found in U.S. design Pat. No. 234,165.

In order to reduce the bulk of prior art walkers, the foldable or collapsable walker was invented. One type of prior art folding walker was invented by Morton I. Thomas and disclosed in U.S. Pat. No. 3, 783,886. Briefly described, that invention comprised a pair of U-shaped support members having feet at one end which are pivotally embraced by a common transversely disposed bar. A special locking means is used to maintain the walker in its unfolded state. A "foldable swingable walker" is disclosed in the patent to Morton I. Thomas and Donald W. Edwards U.S. Pat. No. 3,442,276. Swingable or striding walkers are employed to allow an invalid to advance one or the other of the U-shaped supports in a walking manner. However, striding walkers may be distinguished from other foldable walkers in that the striding walkers are generally not rigidly lockable in a unfolded state. A more recent improvement in the foldable walker art is disclosed in FIGS. 1 – 3 labeled "PRIOR ART". The walker of FIGS. 1 – 3 is discussed in more detail infra.

One major difficulty with prior art foldable or striding walkers is that they are not sufficiently rigid when in the unfolded or operable state. Rigidity is a very important factor since an invalid generally has to be more careful than the average individual and must avoid falling or slipping if at all possible. It has been found that many of the prior art folding or striding walkers had objectionable play in their locking mechanisms which increased the danger to the individual using the walker. One other undesirable feature frequently found in the prior art is that walker legs often have a very limited adjustment range.

SUMMARY OF THE INVENTION

Briefly described, the invention comprises a four legged walker including a first and second U-shaped support section connected together by a transversely disposed bar. The transverse bar has a pair of leg embracing means at each end thereof for pivotally joining the front leg of each of the U-shaped supports. A first and second telescoping member is connected at one end respectively to each of the rear legs of the walker. The other end of the telescoping member is pivotally connected to the transverse bar. The telescoping member comprises an inner and outer tube including a spring loaded locking button therein adapted to secure the telescoping member in its extended state.

In its folded state, the two U-shaped support members are folded inwardly towards the transversely disposed bar. In this manner, the walker takes up a small amount of space and can be conveniently transported or mailed to any desired destination. Additionally, its decreased size allows it to be stored more efficiently. To unfold the walker, the two U-shaped sections are swung outwardly from the transversely disposed bar until the telescoping member is fully extended at which point the locking button rigidly secures the walker in its unfolded state. The telescoping member is connected to the rear leg by a rivet and to the transversely disposed bar by a conventional pivot pin or the like. The rivet connection is such that the telescoping bar lies approximately parallel to the plane of the surface upon which the walker is to be used. It has been found that a rivet connection on the rear leg is sufficient to provide a small amount of flexibility thereby allowing the telescoping member to bend through a few degrees of arc while it passes from the folded to the unfolded state. This particular feature has enabled the present invention to retain the rigidity of a riveted connection while allowing the walker to be readily folded and unfolded. Additionally, the invention includes a novelly located pair of gussets to reinforce the transversely disposed bar member, a leg embracing means, and a unique means for easily extending the range of the leg portion of the bar.

These and other features of the invention will be readily understood in view of the following drawings.

BRIEF DESCRIPTION OF THE DRAWINGS

FIG. 4 is a perspective view of the walker of the present invention as shown in its unfolded or operable state.

FIG. 5 is a partial rearward perspective view of the walker of FIG. 4 showing the telescoping member in its extended state.

FIG. 6 is a perspective view of the walker of the preferred embodiment in its folded state.

DETAILED DESCRIPTION OF THE INVENTION

During the course of this description, like numbers will be used to indicate like elements according to the different figures of the invention.

Figure 1:
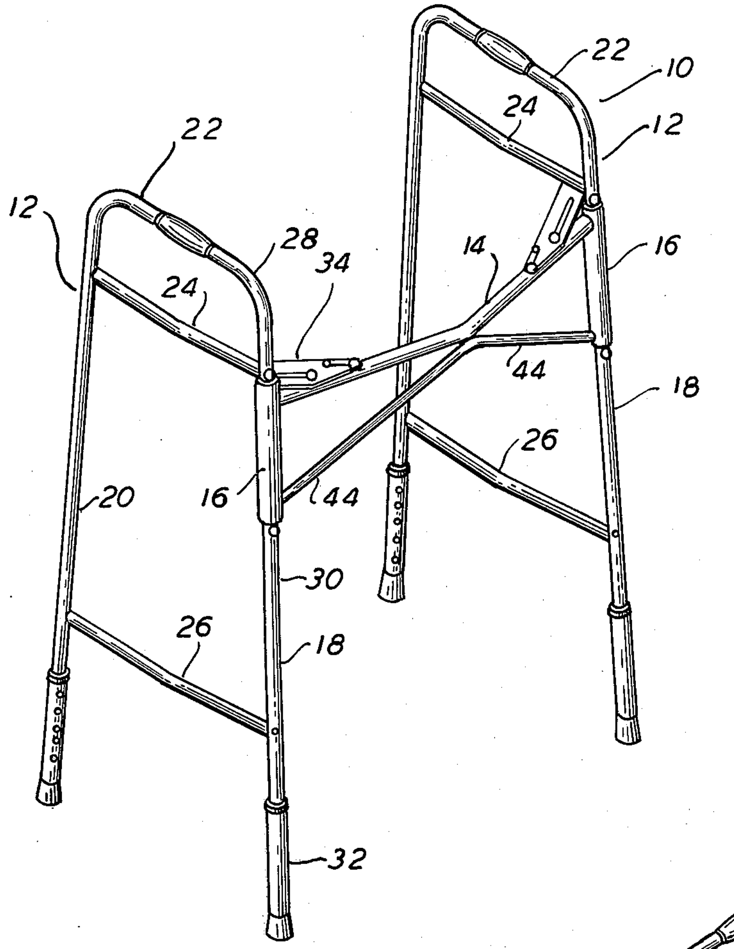
FIG. 1 PRIOR ART
FIG. 1 is a front perspective view of a prior art folding walker.
Figure 2:
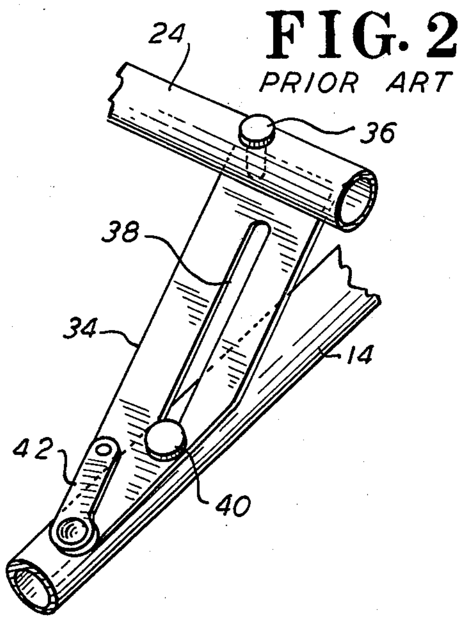
FIG. 2 PRIOR ART
FIG. 2 is a detailed perspective view of the locking mechanism of the prior art walker in FIG. 1.
Figure 3:
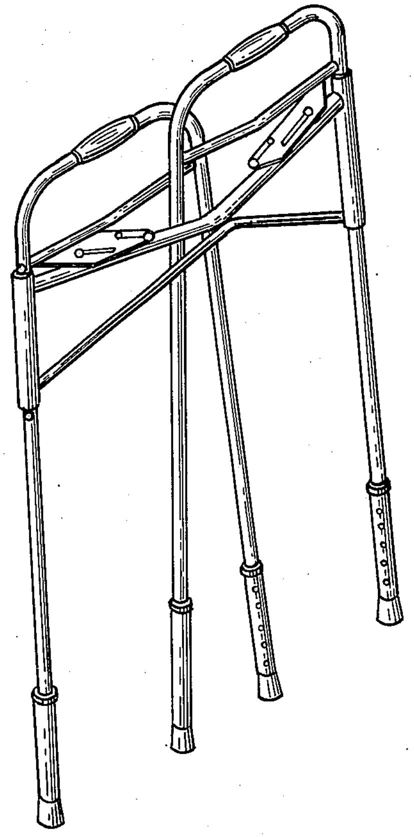
FIG. 3 PRIOR ART
FIG. 3 is another perspective view of the prior art walker of FIG. 1 as shown in its collapsed state.

FIGS. 1 — 3 illustrate a prior art folding walker of the sort known to those of ordinary skill in the art. The prior art walker 10 includes a pair of U-shaped support sections 12 and a transversely disposed bar 14 having leg embracing means 16 at each end thereof. The leg embracing means 16 pivotally engage the front legs 18 of the U-shaped supports 12. The back legs 20 are attached to the front legs 18 by first joining means 22, second joining means 24 and third joining means 26. The front legs 18 and the back legs 20 can be thought of as including a top portion 28, an intermediate portion 30 and a lower portion 32. The first joining means 22 connects the top portions 28 of the legs 18 and 20. The upper intermediate portions of the legs are connected by the second joining means 24. The intermediate portions 30 of the four legs 18 and 20 are joined together by pivotal leg embracing means 16 and the transversely disposed bar 14. The lower portions 32 form the foot section of the legs 18 and 20. The intermediate section 30 telescopes into the lower portion 32. The operating height of the walker can be adjusted by selectively locking the inner portion 30 at a predetermined point within lower portion 32 by means of a spring loaded locking button of the sort well known to those of ordinary skill in the art.

The prior art walker 10 is locked in its unfolded state by a locking device 34 which bridges the second joining member 24 and the transversely disposed bar 14. A detailed view of the locking device 34 can be seen in FIG. 2. One end of locking device 34 is pivotally connected to the second joining means 24 by a pivot pin 36. A slot 38 in the locking means 34 is adapted to engage the head of a rigid post 40 secured to the transversely disposed bar 14. The post 40 is adapted to slide in groove 38. The cap on post 40 is wider than the width of groove 38 and therefore it cannot slip out. The locking device 34 also includes a locking means 42 for securing the walker 10 in its unfolded state as shown in FIG. 1. The locking means 42 comprises a spring loaded button underneath a finger protecting tab. In the unfolded state, as shown in FIGS. 1 and 2, the spring loaded button pops through transversely disposed bar 14 and secures the locking device 34 in the position shown in FIG. 2. In order to fold the walker 10, the locking means 42 is depressed with a finger, thereby forcing the spring loaded button into a detent in the transversely disposed bar 14. With the spring loaded button depressed, it is possible to fold the support sections 12 inwardly towards the transversely disposed bar 14 until the walker assumes its completely folded state, as shown in FIG. 3. During the course of folding, the post 40 travels down the groove 38 toward the second joining means 34.

The prior art walker described with reference to FIGS. 1 – 3 has several severe drawbacks. The greatest drawback is that the walker is not sufficiently rigid in its unfolded state. This lack of rigidity can be traced to several of the features of the prior art walker. In particular, the flat, two-dimensional nature of the locking mechanism 40 does not give it sufficient rigidity in a direction perpendicular to the plane of the locking mechanism 34. In other words, there is not sufficient rigidity in a direction roughly parallel to the legs 18 and 20 due to the flat nature of element 34. Additionally, the locking device 34 is relatively loosely connected to the second joining means 34 through the use of a pivotal pin 36 at one end and a moveable post 40 at the other. Since both connections must allow a significant amount of movement, there is obviously a greater amount of play in these joints than would be found if the locking device 34 were connected through rivets or the like. Moreover, some rigidity is sacrificed because the connecting points 36 and 40 are too close together. Therefore, any play in the locking device 34 due to loose connections at points 36 and 40 is mechanically amplified through the second joining means 24 to the back legs 30. In other words, if point 36 is located one-quarter of the way between the front leg 18 and the back leg 20 then any play in the mechanism 34 is amplified by a factor of four between the front and back legs. One prior art technique used to improve the rigidity of such walkers was to include an additional support member 44 to strengthen the connection between the transversely disposed bar 14 and the leg embracing means 16. While this technique did tend to improve the rigidity of the walker somewhat, it was nevertheless an expensive and unsatisfactory stopgap measure. Undesirable wobble in prior art walkers can also be traced to an insufficiently snug connection between the leg embracing means 16 and the front legs 18. Since safety is extremely important in walkers of this sort, it was highly desirable to develop a walker with greatly improved rigidity in its unfolded state.

A walker according to the preferred embodiment of the present invention is illustrated in FIGS. 4 – 7A. Like the prior art walker of FIGS. 1 – 3, the walker 50 of FIGS. 4 – 7A includes a pair of approximately U-shaped sections 52 connected together by a transversely disposed bar 54 having a leg embracing means 56 at each end thereof. Each U-shaped section 52 includes a front leg 58 and a back leg 60. Each leg includes a top portion 62, an intermediate portion 64 and a lower portion 66. The top portion 62 of the front leg 58 and the back leg 60 is connected by a first joining means 68. A handle 70 is located on the first joining means 68 and adapted to give the user a good grip on the walker. A second joining means 72 connects the lower part of the intermediate portions 64 of the legs 58 and 60.

The walker of FIGS. 4 and 5 is illustrated in the unfolded or operable state. In the fully unfolded state, a telescoping bar 74 rigidly connects the transversely disposed bar 54 with the intermediate portion 64 of the rear legs 60. The telescoping bar 74 is shown to include an inner tube 76 which is adapted to snugly telescope into an outer tube 78. The inner tube 76 is flattened at one end and riveted to the intermediate portion 64 of rear leg 60 by means of a rivet 80. The other end of telescoping bar 74 is connected to the transversely disposed bar 74 by means of a pivot pin 82 which passes through transversely disposed bar 54 and outer tube 78. A locking button 84 serves to lock the telescoping bar 74 in its fully extended state. The slightly domed locking button 84 is preferably spring loaded by means of a leaf spring on the interior of the bar 74. The button is adapted to engage a detent hole in the outer tube 78 in a manner known to those of ordinary skill in the art. Additionally, the button may be slightly domed so as to facilitate a snug fit and easy release.

In the unfolded state, the button 84 pops up through the detent hole in the outer tube 78. In order to fold the walker to the unfolded state as shown in FIG. 6, the button 84 is depressed and the rear legs 60 are folded inwardly towards the transversely disposed bar 54. The locking button can be released by simple manual pressure which depresses the button 84 below the level of the interior of outer diameter 78 thereby allowing inner tube 76 to slide into outer tube 78 during the folding process.

This particular mechanism gives the walker several advantages over walkers known in the prior art. In particular, it adds much greater rigidity than has heretofore been displayed by foldable walkers. The additional rigidity can be traced to several factors. First of all, the connecting telescoping bar 74 is three dimensional and therefore adds additional rigidity in the vertical direction. This was not true of two dimensional type locking devices such as that illustrated as element 34 in FIG. 2. Second, the bar 74 connects the rear leg 60 with the transverse bar 54 as opposed to connecting the second joining means 24 with the transverse bar 14 as shown in FIGS. 1 – 3. By rigidly connecting two points which were further apart than disclosed by prior art techniques, it was possible to reduce the amount of play inherent in prior art devices. Third, the invention of the preferred embodiment is substantially rigidly riveted by rivet 80 to the rear leg 60 and pivotally connected at point 82 to the transverse bar 54. This method allows for significant play at only one end of the telescoping member as opposed to at both ends as might be found in the prior art device illustrated in FIGS. 1 – 3. The rivet connection 80 is very important since it provides very good rigidity yet allows for a small amount of flexibility. The flexibility factor is important since as the walker is folded from its unfolded state as shown in FIG. 4 to its folded state as shown in FIG. 6, the telescoping bar 74 will flex just slightly around rivet point 80. This flexing is due in part to the bending of the leg 60 and the nature of the rivet connection itself. However, in going from the folded to the unfolded state and vice-versa, the telescoping bar 74 only passes through a few degrees of arc. Therefore, according to the present invention, it is possible to eliminate one of the pivot pins of the prior art and replace it with a rigid rivet without sacrificing any other desirable features. It should also be noted that the telescoping bars 74 lie in a plane roughly parallel to the surface upon which the walker is to be used. This is desirable since it facilitates easier folding and unfolding.

Figure 7:
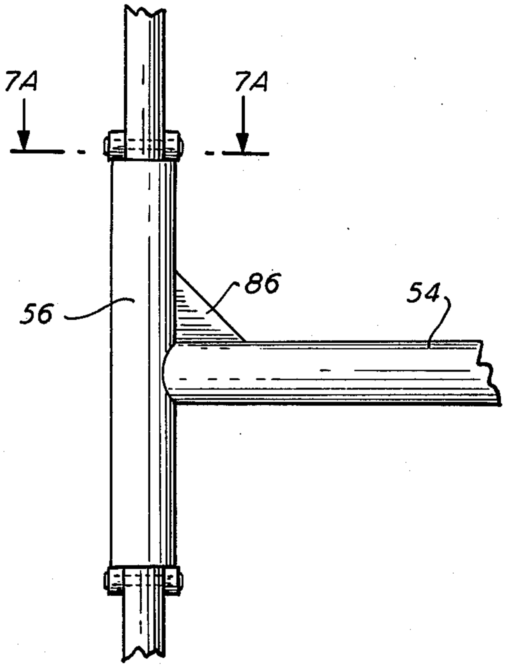
FIG. 7 is a detailed view of the reinforcing gusset located between the transversely disposed bar and the leg embracing means.

Another feature of the preferred embodiment is shown in FIG. 7. Additional rigidity between the transversely disposed bar 54 and the leg embracing means 56 is achieved by a gusset or fillet means 86 which rigidly connects elements 54 and 56. It has been found that the gusset 86 is sufficient to rigidify the transversely disposed bar 54 without the necessity of another support such as that illustrated as element 44 in FIGS. 1 and 3 of the prior art.

Figure 7A:
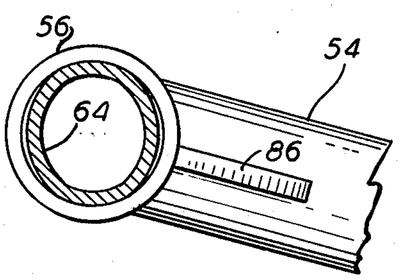
FIG. 7A is a cross-sectional view of the leg embracing means as seen from perspective 7A—7A in FIG. 7.

Another feature of the preferred embodiment is illustrated in FIG. 7A which is a cross section of FIG. 7 as seen from perspective 7A—7A. According to FIG. 7A, the intermediate portion 64 of the front leg 58 is shown to be crimped so as to be snugly engaged by the leg embracing means 56. For purposes of illustration, the crimp of FIG. 7A has been slightly exaggerated to better point out this aspect of the invention. The crimping of intermediate portion 64 is achieved as a by-product of placing rivets in the leg members above and below the leg embracing means 56. The rivets are used to secure washers on opposite sides of the leg means. As shown in FIG. 7, the washers serve to position the leg embracing means 56 securely but rotatably to the intermediate portion 64 of the front legs 56. It has been found that by crimping the intermediate portion 64 within the leg embracing means 56, a great deal or play or wobble can be eliminated. According to FIG. 7A, the crimp in the intermediate portion 64 is shown to be in a direction almost perpendicular to the transversely disposed bar 54. However, it will be appreciated by those of ordinary skill in the art that the crimp could be in almost any direction just as long as it snugly and frictionally engages leg embracing means 56. While the crimp in element 64 is a by-product of the riveting operation, it will be appreciated also that the same effect could be achieved by crimping the leg embracing means 56 only. It will also be noted from the figures that the transversely disposed bar 14 or 54 is bent outwardly from the interior of the walker 10 or 50 respectively. This feature of the invention allows the support sections to fold inwardly and present a much more compact collapsed bundle in the folded state. It additionally gives the invalid slightly more room in which to move his legs in the forward direction.

During the course of this discussion, it will be appreciated that the materials comprehended by the invention include conventional invalid walker materials such as anodized aluminum tubing and/or steel materials. The gusset 86 itself comprises a metallic material which may be welded between elements 54 and 56.

Figure 8:
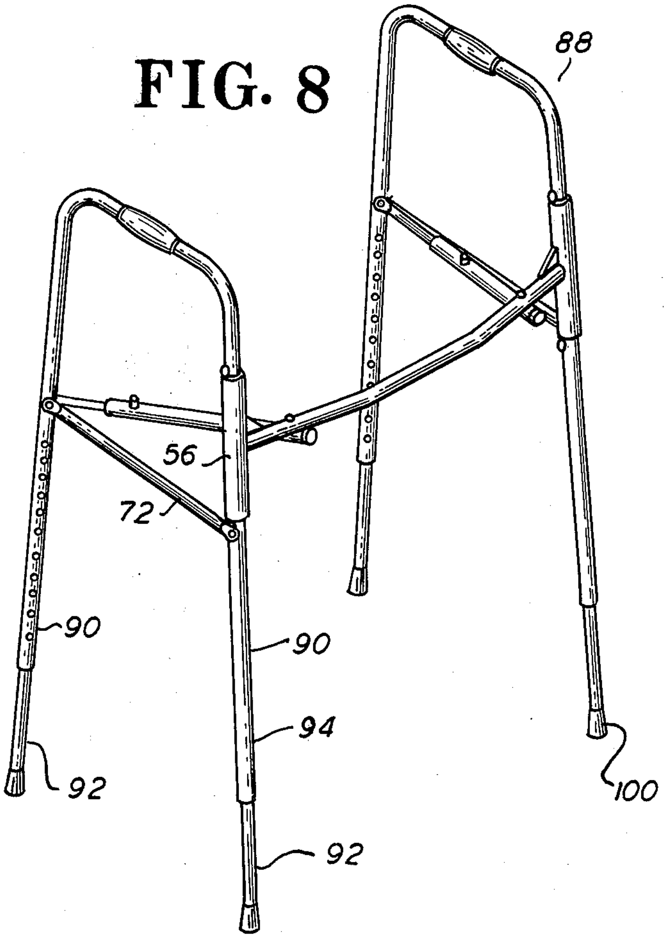
FIG. 8 is a front perspective view of another embodiment of the present invention with the walker in its unfolded state.
Figure 9:
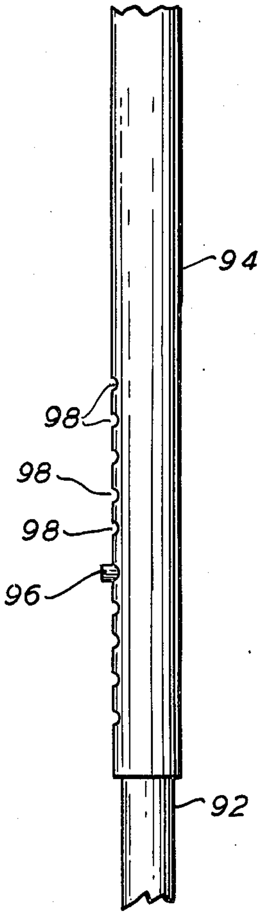
FIG. 9 is a detailed view of the leg section of the walker illustrated in FIG. 8.

An alternative embodiment of the present invention is illustrated as walker 88 in FIGS. 8 and 9. Walker 88 differs from the preferred embodiment of walker 50 in that the lower portions 92 of the legs 90 telescope into the intermediate portions 94. This is the reverse of the situation illustrated in FIGS. 3 – 6 wherein the intermediate portion 64 telescope into the lower portion 66 of the leg members 58 and 60. Due to this type of construction, it has been found necessary to move the second joining means upward from its position, as shown in FIG. 4, and closer to the leg embracing means 56 as shown in FIG. 8. The alternative embodiment has the advantage that it greatly extends the height range of the walker unit over prior art walkers, such as that disclosed in FIGS. 1 – 3. The additional height range is attributable to the fact that it is possible to add more detent holes to the longer intermediate section 94 that it is to add detent holes to the shorter portion 32 of prior art walkers.

A detailed view of a typical leg section of walker 88 is shown in FIG. 9. In that view, a spring loaded button 96 is shown emerging from one of a plurality of detents 98 in the intermediate portion 94 of the leg 90. Since the intermediate portions of the legs of the invalid walkers are longer than the lower portions, it is possible to provide more stops for the button 96. The spring loaded button 96 forms a second locking means for the walker; the first locking means, of course, being button 84 of telescoping bar 74. The nature of the spring loaded button is such that its range is limited to the number of detents 98 in the larger diameter tube 94 and is not substantially limited by the length of the lower section 92.

During the course of this detailed description of the invention, it will be appreciated by those of ordinary skill in the art that certain changes or modifications can be made to the basic concept. For example, while the preferred leg and support material is described as being anodized aluminum or a suitable type of steel, obviously other types of material may be used as well. The handle section 70 and the foot pad 100 are preferably made of a suitable plastic but rubberized materials may also be used. In general, rivets are used to connect the telescoping bar 74 to the rear leg 60 at point 80 according to the preferred embodiment. Additionally, the second joining means 72 is connected to the frame by rivet. Rivets are a conventional and preferred connecting means. However, other means are known to those of ordinary skill in the art which might be suitable under different circumstances.

While the invention has been particularly shown and described with reference to the preferred embodiment thereof, it will be understood by those skilled in the art that various changes in form and detail may be made therein without departing from the spirit and scope of the invention.

I claim:

1. An improved foldable walker adapted to fold to a collapsed state and to unfold to a rigid unfolded state, said walker comprising:

a first and second U-shaped support, each support having at least a front and rear leg member each including a top portion, an intermediate portion and a lower portion, and a first joining means for connecting the top portions of the front and rear leg members of each of said first and second supports;

a transversely disposed bar having leg embracing means at each end thereof for pivotally joining the front leg members of said supports one to the other;

a first and a second telescoping member each having one end thereof pivotally connected to said transversely disposed bar and each having at the other end thereof a flattened end attached to the rear leg members of said first and second supports respectively by an attaching means comprising a rivet-like means connecting said flattened ends of said first and second telescoping members to the rear leg members of said first and second supports, respectively, which allows said telescoping members to turn slightly with respect to said rear leg members when said walker is folded from said unfolded to said folded state and vice versa; and, a first locking means for locking said telescoping members in an extended state.

2. The walker of claim 1 wherein said telescoping members include:

an outer tube; and, an inner tube adapted to slide snugly within said outer tube.

3. The walker of claim 2 wherein said first locking means comprises:

a spring loaded button adapted to engage a detent hole in said outer tube.

4. The walker of claim 1 further including:

a gusset means located between said transversely disposed bar and said leg embracing means for providing additional support thereto.

5. The walker of claim 1 wherein said first joining means includes a handle thereon.

6. The walker of claim 5 wherein said leg members are extensible and wherein said lower portion is adapted to telescope inside of said intermediate portion, said leg members further including a second locking means for selectively locking said lower portion at any one of a plurality of predetermined locations within said intermediate portion.

7. The walker of claim 5 wherein said leg members are extensible and wherein said intermediate portion telescopes inside of said lower portion, said leg members further including a locking means for locking said intermediate portion at any one of a plurality of predetermined locations within said lower portion.

8. The walker of claim 5 further including a second joining means for rigidly connecting the intermediate section of said front and rear leg members of said first and second sections respectively together.

9. The walker of claim 1 wherein the leg embracing means of said transversely disposed bar comprises a pair of hollow tubes adapted to snugly surround the intermediate sections of said front leg members.

10. The walker of claim 9 wherein the front leg members are slightly crimped to an oblong shape so as to frictionally engage the leg embracing means.

* * * * *